United States Patent [19]
Giger et al.

[11] Patent Number: 5,974,165
[45] Date of Patent: *Oct. 26, 1999

[54] AUTOMATED METHOD AND SYSTEM FOR THE ALIGNMENT AND CORRELATION OF IMAGES FROM TWO DIFFERENT MODALITIES

[75] Inventors: Maryellen L. Giger, Elmhurst; Chin-Tu Chen, Lisle; Samuel Armato, Chicago; Kunio Doi, Willowbrook, all of Ill.

[73] Assignee: Arch Development Corporation, Chicago, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/523,210

[22] Filed: Sep. 5, 1995

Related U.S. Application Data

[63] Continuation of application No. 08/159,136, Nov. 30, 1993, abandoned.

[51] Int. Cl.$^6$ .............................. G06K 9/36; G06T 5/40; G06T 7/60
[52] U.S. Cl. ..................... 382/132; 382/172; 382/199; 382/266; 382/273; 382/288; 382/294
[58] Field of Search .................. 364/413.13, 413.14, 364/413.18, 413.19, 413.22; 395/127, 135; 382/131, 132, 270, 272, 294, 273, 266, 199, 172, 173, 288; 128/922

[56] References Cited

U.S. PATENT DOCUMENTS

| | | | |
|---|---|---|---|
| 4,907,156 | 3/1990 | Doi et al. | 382/130 |
| 4,977,505 | 12/1990 | Pelizzari et al. | 600/425 |
| 5,072,384 | 12/1991 | Doi et al. | 382/132 |
| 5,133,020 | 7/1992 | Giger et al. | 382/128 |
| 5,832,103 | 11/1998 | Giger et al. | 382/130 |

OTHER PUBLICATIONS

"Image Feature Analysis and Computer–Aided Diagnosis in Digital Radiography: Automated Analysis of Sizes of Heart and Lung in Chest Images", Nakamori et al., Med. Phys. 17(3), May/Jun. 1990, 1990 Am. Assoc. Phys. Med., pp. 342–350.

"Localization of Inter–Rib Spaces for Lung Texture Analysis and Computer–Aided Diagnosis in Digital Chest Images", Powell et al., Med. Phys. 15(4), Jul./Aug. 1988, 1988 Am. Assoc. Phys. Med., pp. 581–587.

"Detection and Classification of Circular Structures on SPOT Images" by Parrot et al. IEEE Transactions on Geoscience and Remote Sensing, vol. 30, No. 5, pp. 996–1005, Sep. 1992.

Kim et al. "Correlation of Cardiac MRI and PET Images Using Lung Cavities as Landmarks." Proc. Computers in Cardiology, pp. 49–52, Sep. 1990.

(List continued on next page.)

*Primary Examiner*—Jon Chang
*Attorney, Agent, or Firm*—Oblon, Spivak, McClelland, Maier & Neustadt, P.C.

[57] ABSTRACT

A method and system for the computerized registration of radionuclide images with radiographic images, including generating image data from radiographic and radionuclide images of the thorax. Techniques include contouring the lung regions in each type of chest image, scaling and registration of the contours based on location of lung apices, and superimposition after appropriate shifting of the images. Specific applications are given for the automated registration of radionuclide lungs scans with chest radiographs. The method in the example given yields a system that spatially registers and correlates digitized chest radiographs with V/Q scans in order to correlate V/Q functional information with the greater structural detail of chest radiographs. Final output could be the computer-determined contours from each type of image superimposed on any of the original images, or superimposition of the radionuclide image data, which contains high activity, onto the radiographic chest image.

52 Claims, 15 Drawing Sheets

OTHER PUBLICATIONS

Kottke et al. "Comparison of Gray–Scale Thresholding Algorithms Applied to Coronary Arteriograms." Proceedings of Annual Int. Conf. of IEEE Eng. in Med. and Bio. Society. vol. 2, Nov. 1989, pp. 382–383.

Kenny et al. "A Technique for Digital Image Registration Used Prior to Subtraction of Lung Images in Nuclear Medicine." Phys. Med. Biol. vol. 35, No. 5, 1990, pp. 679–685.

Kramer et al. "CT–SPECT Fusion for Analysis of Radiolabeled Antibodies: Applications in Gastrointestinal and Lung Carcinoma." Nucl. Med. Biol. vol. 18, No. 1, 1991, pp. 27–42.

Kaplan et al. "Composite SPECT–CT Images: Technique and Potential Applications in Chest and Abdominal Imaging." Am. J. Roentgenol. vol. 152, 1989, pp. 865–866.

Gonzalez et al. *Digital Image Processing.* Addison–Wesley, 1992, pp. 518–528.

Barrett et al. "A Relaxation Algorithm for Segmentation of the Endocardial Surface from Line CT." Proc. Computers in Cardiology Sep. 1989, pp. 95–98.

Suzuki et al. "Knowledge–Guided Automatic Thresholding for 3–Dimensional Display of Head MRI Image." $9^{th}$ Int. Conf. Pat. Rec. Nov. 1988, pp. 1210–1212, vol. 2.

Bidaut, "Accurate Registration of Various Medical Imaging Modalities: An Application to PET and MRI for Anatomical Localization and Kinetic Modelling." $6^{th}$ Mediterranean Electrotechnical Conf. vol. 2, May 1991, pp. 1233–1237.

Kottke et al. "Adaptive Segmentation of Coronary Angiograms." Proc. $14^{th}$ Annual NE Bioengineering Conf., Mar. 1988, pp. 287–290.

Ibrahim et al. "DPCM Edge Detection Using Local Histogram." Int. Conf. on Image Processing and Its Applications, Apr. 1992, pp. 542–545.

Bartoo et al. "Multi–Modality Image Registration Using Centroid Mapping" Proc. Int. Conf. of IEEE Eng. in Med. and Bio. Soc., vol. 2, Nov. 1989 pp. 550–551.

Moshfeghi, "Multimodality Image Registration Techniques in Medicine" Proc. Int. Conf. of IEEE Eng. in Med. and Bio. Soc., vol. 6, Nov. 1989, pp. 2007–2008.

Gonzalez et al. *Digital Image Processing*, 1992, Addison-–Wesley, pp. 443–457.

Curry et al. *Christensen's Introduction to the Physics of Diagnostic Radiology*, 1984, Lea & Febiger, pp. 433–443.

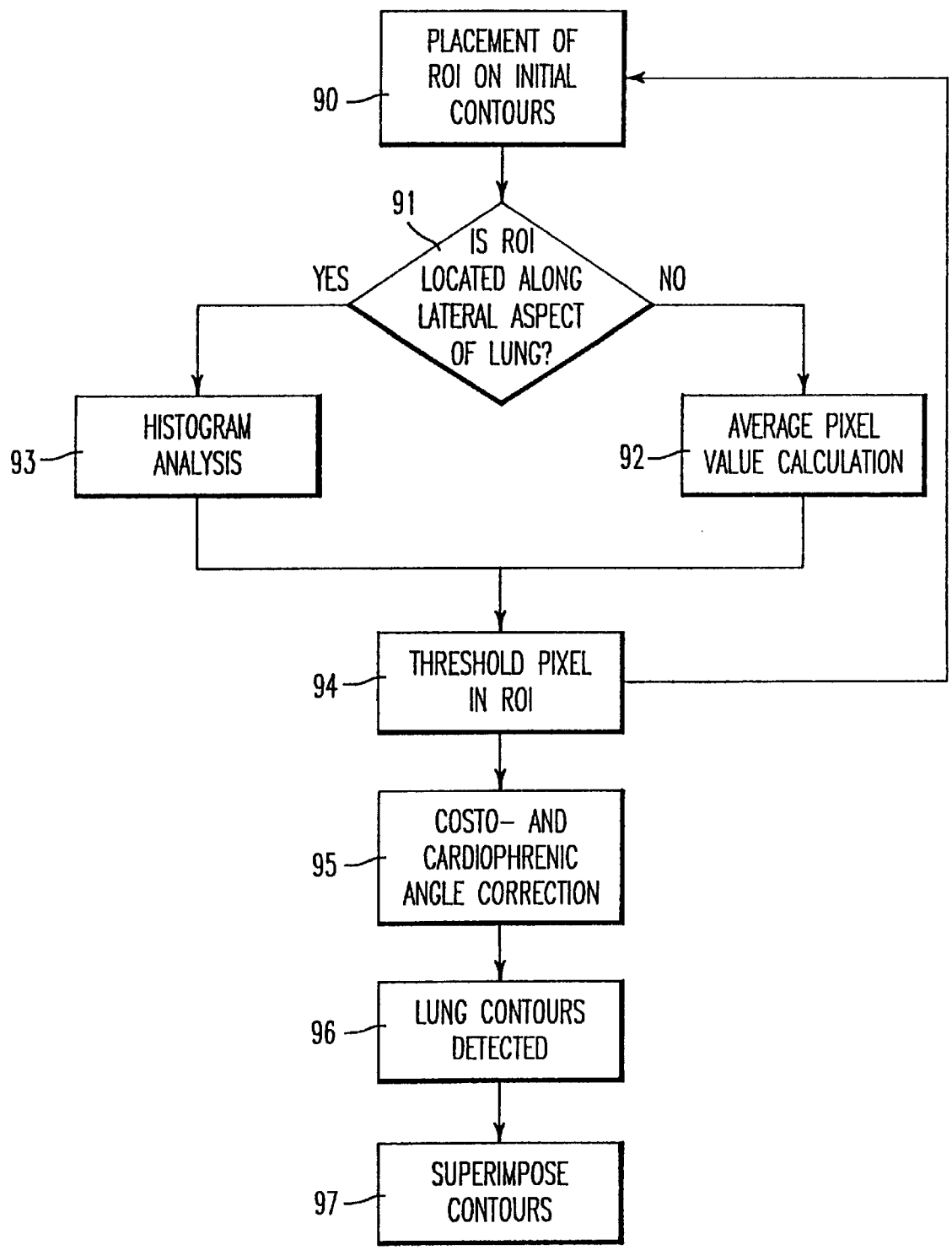

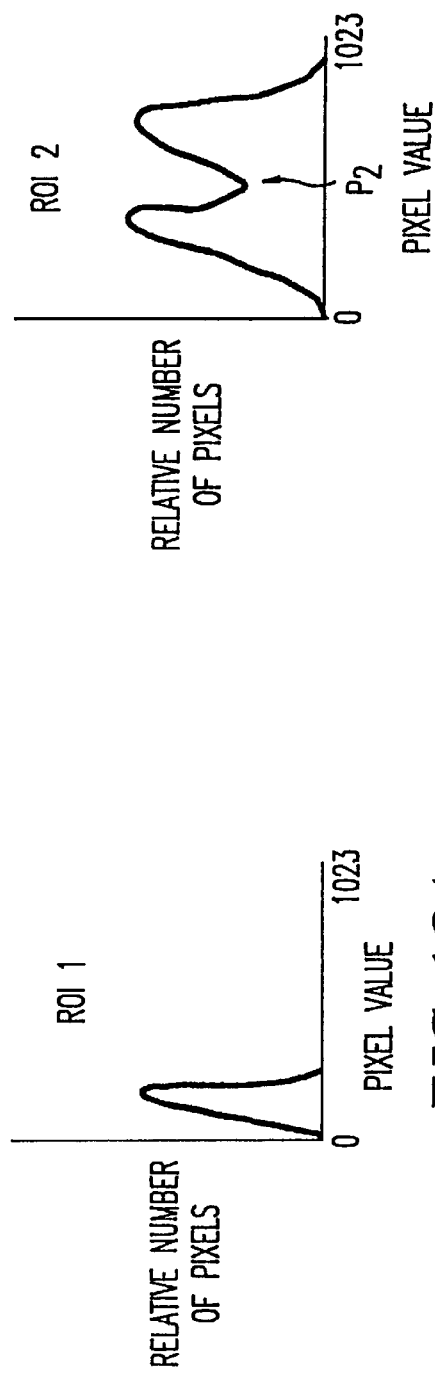
FIG. 19A
FIG. 19B
FIG. 19C
FIG. 19D

AUTOMATED METHOD AND SYSTEM FOR THE ALIGNMENT AND CORRELATION OF IMAGES FROM TWO DIFFERENT MODALITIES

This application is a continuation of application Ser. No. 08/159,136, filed on Nov. 30, 1993, now abandoned.

The present invention was made in part with U.S. Government support under NIH grant/contracts NS 30400, USPHS CA48985, USPHS CA09649, USPHS CA52101, and USPHS CA47043; Army grant/contract DAMD 17-93-J-3021; American Cancer Society grant/contract FRA-390; and DOE grant/cotracts 86ER60438 and 86ER60418. The U.S. Government has certain rights in the invention.

BACKGROUND OF THE INVENTION

1. Field of the Invention

The invention relates generally to a method and system for the computerized registration of images obtained from two different modalities, and in particular, computerized registration of radionuclide images with radiographic images. Specific applications are given for the automated registration of radionuclide lungs scans with chest radiographs.

2. Discussion of the Background

Computer-aided diagnosis (CAD) has potential to become a valuable tool for detecting subtle abnormalities in medical imaging and, in particular, chest radiographs and radionuclide images. Chest radiographs and radionuclide images (nuclear medicine scans) such as ventilation/perfusion (V/Q) scans are used to visually evaluate pulmonary embolism, chronic lung disease, heart disease and preoperative lung function. Currently, radiologists assess correlation between the images (exams) visually by looking at three separate types of film images. It would be beneficial for the radiologist to be able to more accurately match V/Q defects to radiographic findings.

This patent application presents a method and system for the computerized registration of radionuclide images with radiographic images. Specific applications are given for the automated registration of radionuclide lungs scans with chest radiographs. Techniques include contouring the lung regions in each type of chest image, scaling and registration of the contours based on location of lung apices, and superimposition after appropriate shifting of the images. The method in the example given yields a system that spatially registers and correlates digitized chest radiographs with V/Q scans in order to correlate V/Q functional information with the greater structural detail of chest radiographs.

SUMMARY OF THE INVENTION

Accordingly, an object of this invention is to provide an automated method and system for registering and correlating images obtained from two different modalities.

A second object of this invention is to provide an automated method and system for computerized registering and correlating radiographic images with radionuclide images.

Another object of this invention is to provide an automated method and system for the segmentation of anatomic regions in radiographs.

Another object of this invention is to provide an automated method and system for the segmentation of regions of interest in radionuclide images.

Another object of this invention is to provide an automated method and system for scaling to each other, radiographic images and radionuclide images of the same body part.

Another object of this invention is to provide an automated method and system for distinguishing abnormal regions based on analysis of the correlated radiographic images and radionuclide images.

These and other objects are achieved according to the invention by providing a new automated method and system in which images from two different modalities are obtained and analyzed. In an embodiment of the invention, at least one radiographic images and one radionuclide image are obtained. Gray level thresholding is performed on the radiographic image, including iterative global thresholding and local thresholding, in order to segment the aerated lung regions. Noise analysis is performed on the radionuclide image, such as an anterior perfusion scan image, in order to segment the lung regions. Lung contours are then detected in both the radiographic image and the radionuclide image. The contours are analyzed in order to determine the scaling necessary to align the radiographic image with the radionuclide image. After scaling of the radiographic image, the two modality images are superposed in order to simultaneously show structural detail and functional information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 is a schematic diagram illustrating the automated method for the local thresholding for the detection of the boundary of the thorax according to the invention;

FIGS. 19A–19D are plots of the pixel distribution of ROIs of FIG. 18.

DETAILED DESCRIPTION OF THE PREFERRED EMBODIMENTS

Figure 1:
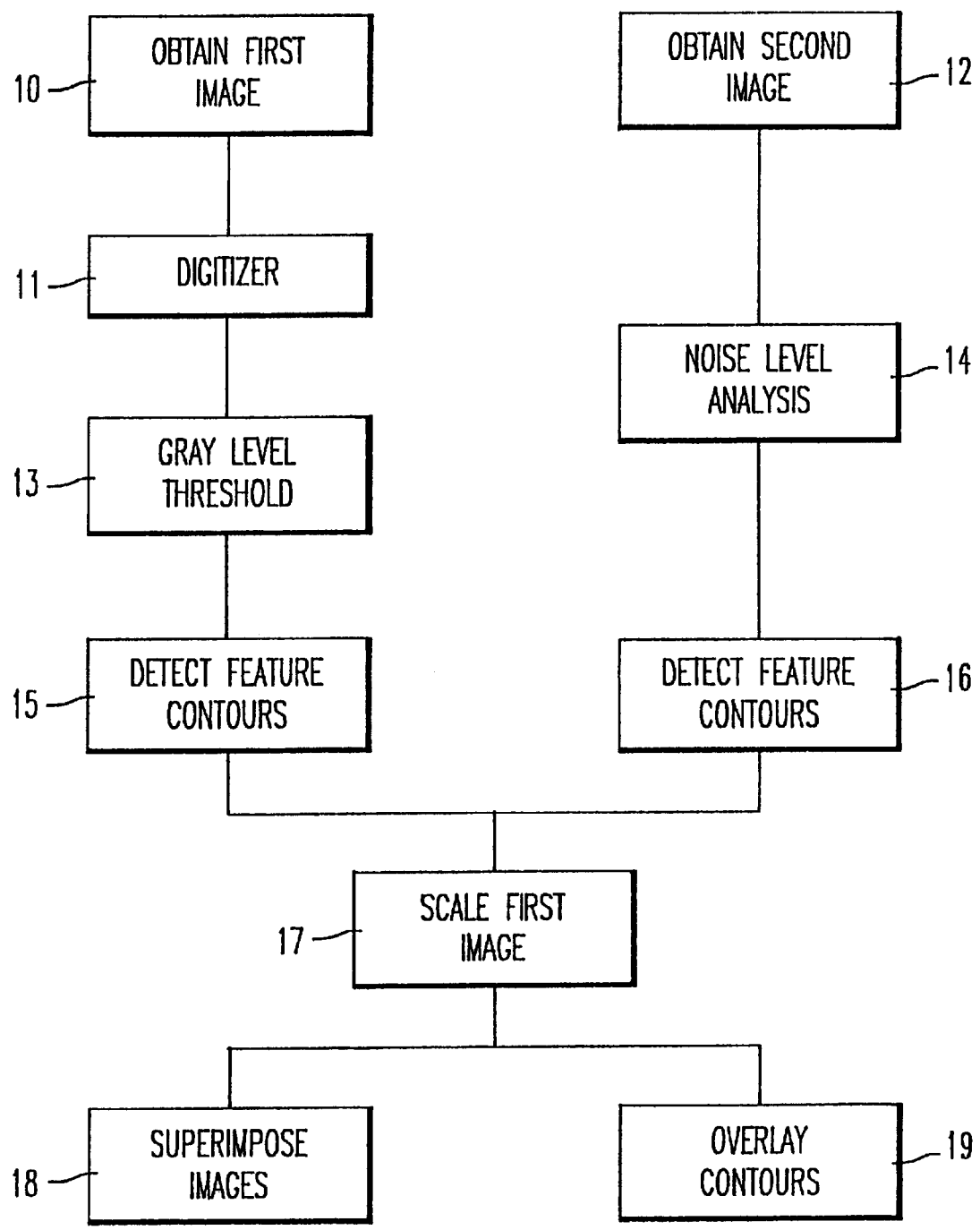
FIG. 1 is a schematic diagram illustrating the automated method for registration and correlation of chest radiographs with radionuclide lung scans according to the invention.

Referring now to the drawings, and more particularly to FIG. 1 thereof, a schematic diagram of the automated method according to the invention is shown. In this example the method is used for the detection of gross abnormalities and asymmetries in chest images. The method includes an initial acquisition of a first image (step 10), such as a radiograph of the thorax, digitization of the image (step 11), and an acquisition of a second image, such as at least one radionuclide image of the same anatomic region (step 12). Next, the gray-level thresholding analysis is performed (step 13) to detect the aerated lung boundaries in the radiographic chest image. Then, noise analysis (step 14) is performed to delineate the boundaries of the lung regions in the radionuclide image. Feature contours are then detected (steps 15 and 16). In this example, the features are the lung contours. Geometric measures from the two contours are then used to determine the scaling factor and translation needed to register the two types of chest images. After the appropriate scaling (step 17), the images are either superimposed (step 18) or the contours are overlaid on one or both types of images (step 19).

Figure 2:
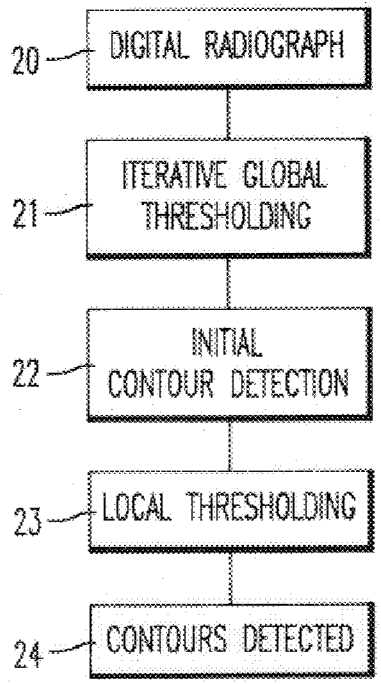
FIG. 2 is a schematic diagram illustrating the automated method for the contour detection in the radiographic chest image.
Figure 3:
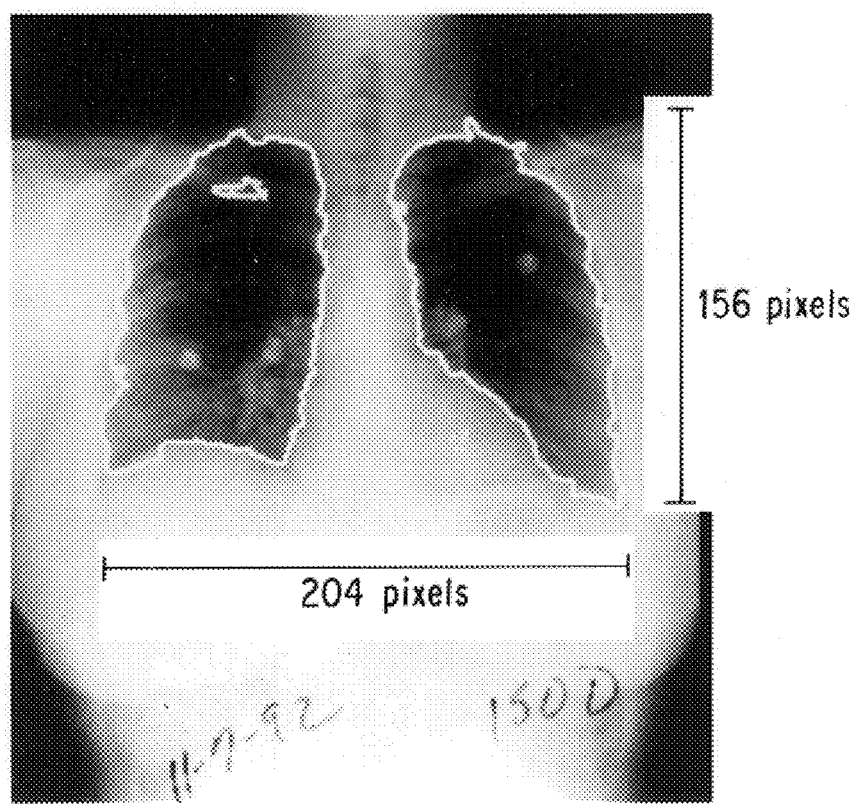
FIG. 3 shows a chest image with the aerated lung regions delineated.

FIG. 2 illustrates the method for contour detection on the chest radiographic image. After obtaining the chest image (step 20), iterative gray level histogram analysis (step 21) is performed within a large rectangular region centered approximately over the thorax. A running slope (first derivative) is used to determine the gray level at which the lung peak and the minimum between the lung and mediastinum peaks occur. This represents the range of thresholds to be used in constructing binary images during the iterative global thresholding process. At each threshold level, an 8-point connectivity scheme is used to construct contours around contiguous "on" pixels in the binary image (step 21). A centroid check is employed to turn "off" regions that fall outside the lung regions, thereby preventing these regions from merging with regions inside the lungs at later iterations. After 7 such iterations, an initial set of contours representing the aerated region of the lungs is produced (step 22). A local thresholding scheme is then used to more accurately capture the aerated region of the lungs (step 140). Gray-level thresholding is performed individually within 31×31 pixel ROIs centered along the initial contours. This results in a final binary image that is contoured to produce the final set of lung region contours (step 24). FIG. 3 shows a chest image with the aerated lung regions delineated.

Figure 4:
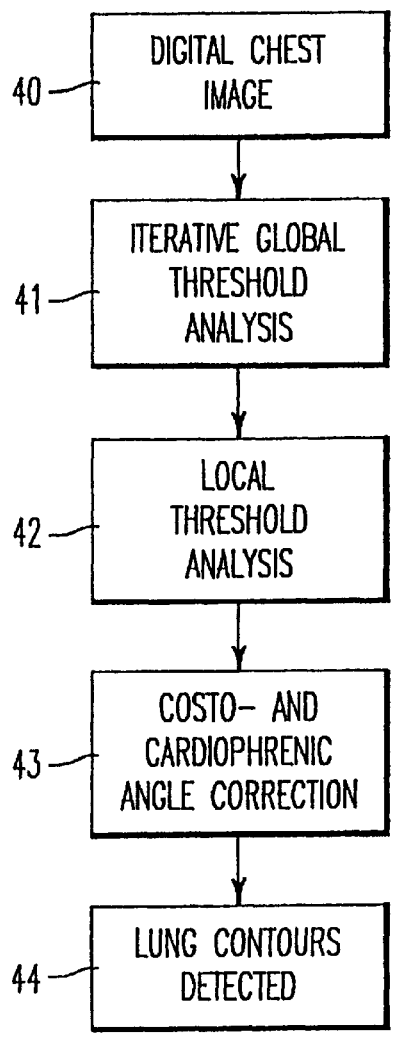
FIG. 4 is a schematic diagram illustrating the automated method for detection of asymmetric abnormalities according to the invention.

Steps 21–24 of the method shown in FIG. 2 will now be described in more detail. Referring to FIG. 4 thereof, a schematic diagram of the automated method for the detection of gross abnormalities and asymmetries in chest images is shown. The overall scheme includes an initial acquisition of a radiograph of the thorax and digitization to produce a digital chest image (step 40). Detection of aerated lung boundaries is performed initially using an iterative, global thresholding technique (step 41) which includes and a centroid test. After which, the initial contours are used for positioning of the ROIs for a local thresholding technique (step 42). After the local thresholding procedure, there is a correction for the costo- and cardiophrenic angle (step 43). The lung contours are then determined (step 44).

Figure 5:
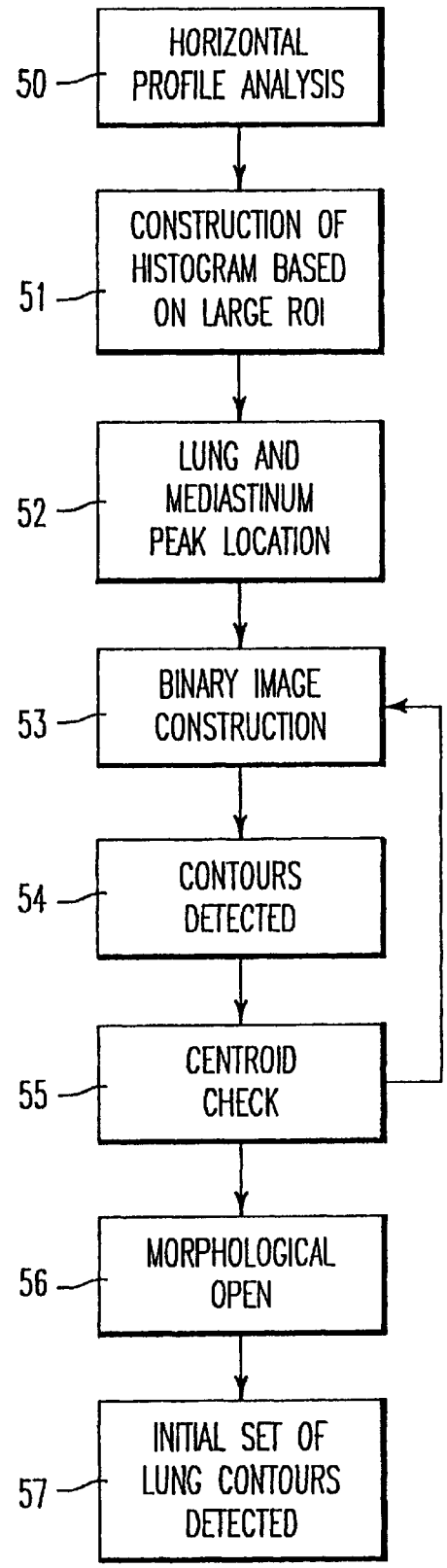
FIG. 5 is a schematic diagram illustrating the automated method for the iterative, global thresholding for the detection of the boundary of the thorax according to the invention.

FIG. 5 shows a schematic diagram illustrating the automated method for the iterative global thresholding for the detection of the boundary of the thorax. Initially, horizontal gray-level profiles in the image are calculated (step 50) and used to determine the location of the mediastinum and the lung apices. This information is used throughout the scheme in order to differentiate the right hemithorax from the left and to identify an upper bound in the image that prevents the contours from growing along the neck. This information is required for each image to compensate for differences in patient positioning.

A global gray-level histogram is used to initially segment the lungs in the chest image (step 51). In an effort to obtain more uniform histograms, the calculation of the histogram is effectively centered over the thorax. In this example, a 181×141 pixel region centered 70 pixels from the top of the image, i.e. over the thorax, was chosen. Step 52 of the method shown in FIG. 5 where the lung and mediastinum peaks are located will now be described. The typical histogram (FIG. 6) resulting from such a region exhibits two peaks 60 and 61: one centered over lower gray values that corresponds to pixels predominantly within the lungs, and another centered over higher gray values that corresponds to pixels predominantly in the mediastinum, in the ribcage edge, and, presumably, in any asymmetric abnormality that may be present, respectively.

The goal with regard to performing global threshold analysis, therefore, is to use the histogram in order to determine an appropriate gray value that separates the gray values belonging to pixels within the aerated lung region from those that are located outside the lungs. The task of determining an appropriate threshold proved to be impossible based on the selection of a single gray value. Values were either too low and the resulting binary image insufficiently captured the lung regions, or the values were too high and the lung regions merged with regions outside the lungs; in most cases, a certain threshold value resulted in the former condition in one area of the lung region and in the latter condition in another area.

Figure 6:
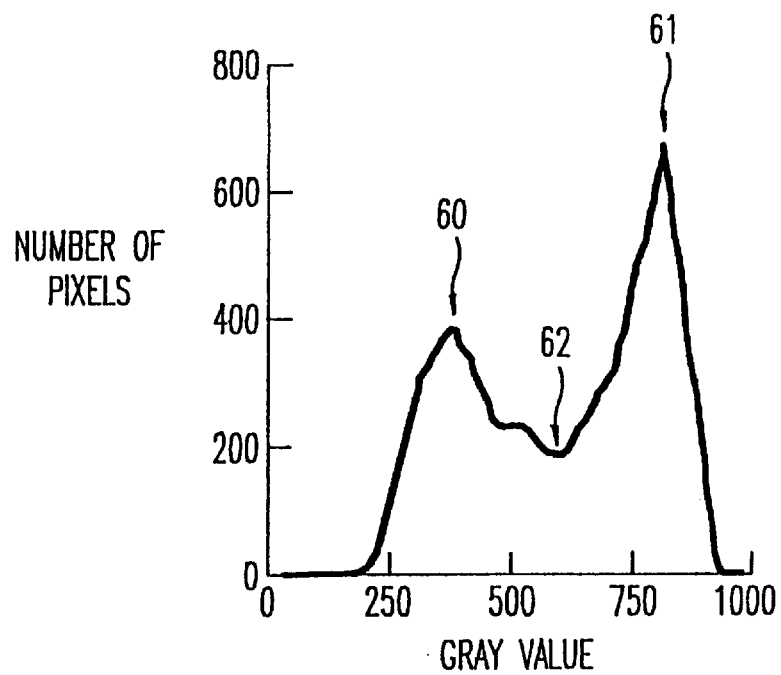
FIG. 6 is a graph illustrating the gray-level histogram of a chest image indicating the computer-determined location of the lung peak and the minimum between the lung and mediastinum peaks; This represents the range of gray values used in the iterative thresholding technique.

This problem is overcome by introducing an iterative global threshold scheme. Instead of choosing one gray-level threshold value, a range of values is used in succession. The running slope (first derivative) of the global gray-level histogram is used in order to identify the gray value at which the peak (60 in FIG. 6) corresponding to the lung regions occurs and the gray value at which the minimum between the lung and mediastinum peaks occurs (62 in FIG. 6). A number of equally-spaced gray values between this peak and minimum are then each used in a threshold iteration. In this example 7 gray values were detected. A typical histogram along with the range of gray-level thresholds used during the iterative global gray-level thresholding is shown in FIG. 6.

The iterations are used to create a binary image (step 53). The first iteration creates a binary image by using the smallest of the seven gray values (i.e. the highest optical density of the range) as the threshold limit. Pixels are turned "on" in the binary image if the corresponding pixel in the image has a gray value greater than a certain level above the background level, such as 10, but less than this threshold limit. FIGS. 7A–7E illustrates, schematically, the binary images that result from applying four different gray-level thresholds to a chest image.

Figure 7A:
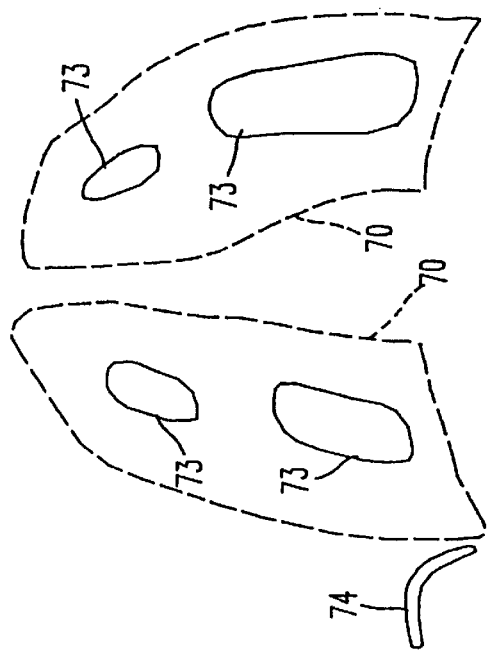
FIGS. 7A–7E shows binary images created by thresholding a chest image at different gray values.

In FIG. 7A, the result of thresholding at a smaller threshold is shown. The actual lung boundary 70 is shown for reference only. The thresholding produces a number of regions 71 within the lung boundary 70 and a region 72 outside of the boundary 70. The region 72 is eliminated by a centroid check described below.

The resulting binary image is sent to the contour detection routine, which utilizes a connectivity scheme (such as 8-point) to identify contours representing the boundaries of groups of contiguous "on" pixels (step 54). Connectivity schemes are described, for example, in "Automatic segmentation of liver structure in CT images," by K. Bae, M. L. Giger, C. T. Chen, and C. Kahn, (Medical Physics 20, 71–78 (1993)). The routine also calculates important geometrical properties of these contours, such as the centroid of the contour, contour compactness, contour length (in terms of pixels), and the area enclosed within the contour (in terms of pixels).

Figure 8:
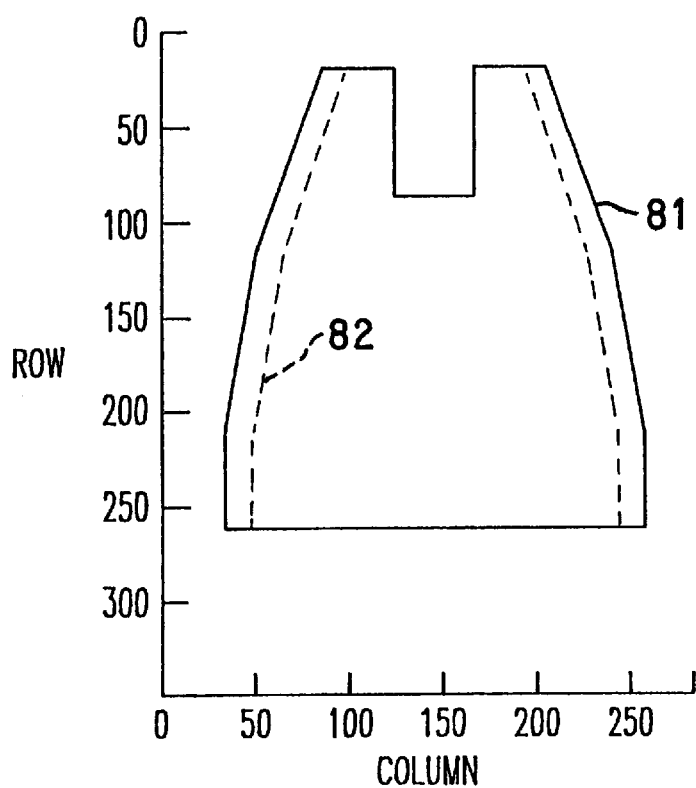
FIG. 8 is a graph showing the empirically-determined centroid limit plotted on image-based coordinates, where contours with centroids outside this limit are eliminated from the image.

The centroid of a contour is used to determine whether the pixels within that contour are within a region that is likely to contain lung (step 55). A "centroid limit" can be empirically constructed by analyzing the centroids of all contours resulting during all of the threshold iterations. The limit 81, shown in FIG. 8, is based on the spatial distribution in the image plane of the centroids of contours falling within the lung regions and the centroids of contours external to the lungs for 28 chest images. If the centroid of a contour falls outside this limit, the pixels enclosed by this contour are turned "off" (such as region 72 in FIG. 7A). These external regions are thus prevented from merging with regions within the lungs at later iterations where the threshold gray value is greater and the likelihood of such a merge is increased. This allows for the most complete identification of the lungs without also incorporating extraneous area.

Figure 7B:
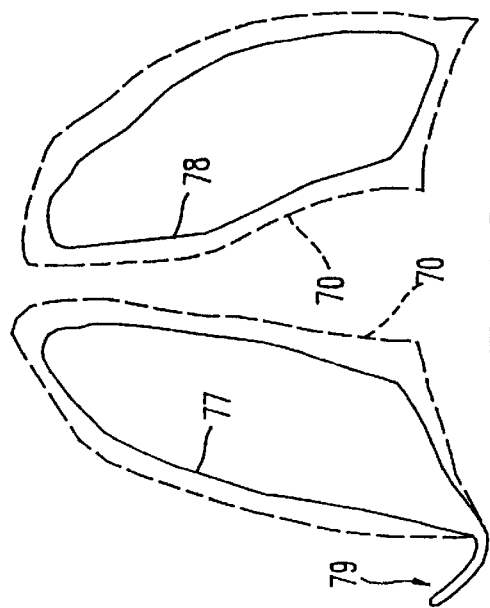
Figure 7C:
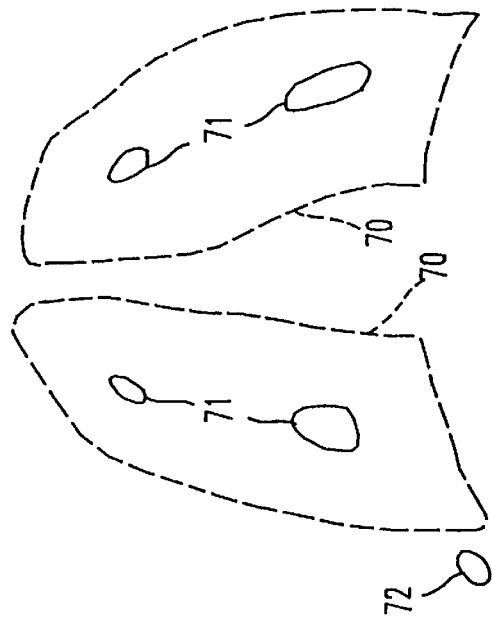
Figure 7D:
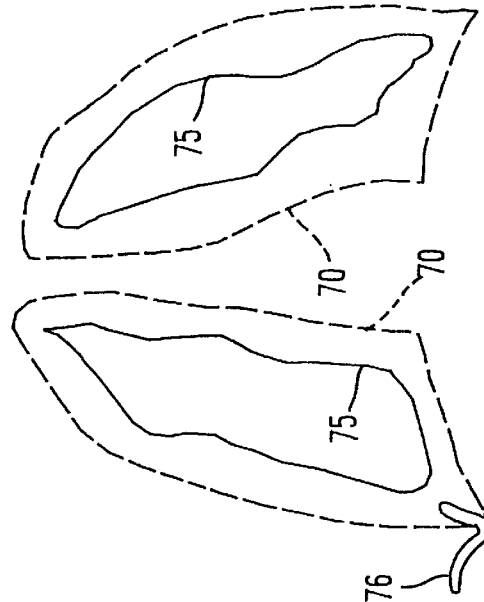

This process of thresholding to create a binary image, identifying contours, and turning pixels "off" based on a centroid check is repeated for each of the iterations, with the threshold gray value used to produce the binary image increasing at each iteration. FIGS. 7B–7D show the results of subsequent iterations. In FIG. 7B, larger regions 73 are determined within the lung boundary 70 along with a region 74 which is also eliminated by the centroid check. Larger regions 75 are determined within the lung boundary 70 shown in FIG. 7C. Also shown in FIG. 7C is a region 76 which contains pixels outside of the lung boundary 70, but is not eliminated by the centroid check as it has a centroid within the limit as shown in FIG. 8. FIG. 7D shows an iteration at a higher pixel value where the regions 77 and 78 are now closely approximating the lung boundary 70. The iterative thresholding technique can be thought of as finding the perimeter of a mountain range at various heights, with lower threshold values being closer to the top of the mountain range.

It should be pointed out that a more strict centroid limit could be employed during the later iterations, since the spatial distribution of lung contours typically becomes more confined as the threshold level is increased. The stricter centroid limit shown as 82 in FIG. 8 could eliminate regions such as region 76.

Figure 7E:
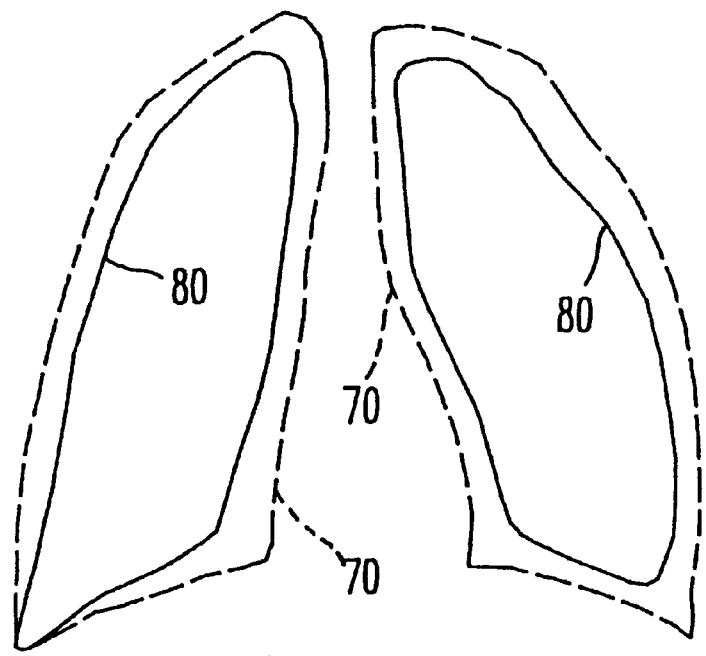

A morphological open operation with a 3×3 kernel is also applied during each of the final two iterations (step 56). The morphological open operation is described in, for example, *Image Analysis and Mathematical Morphology* by J. Serra (Academic, New York, 1982). This combination of an erosion filter followed by a dilation filter eliminates many of the slender artifacts that remain "on" in the binary image as a result of the process that turns "off" regions of the image based on the centroid check. Thus as shown in FIG. 7E, the morphological open operation can eliminate the slender portion 79 of region 78 to give contours 80. The final result of the global threshold iterations is an initial set of contours representing the aerated lung regions in the image (step 57).

Figure 10:
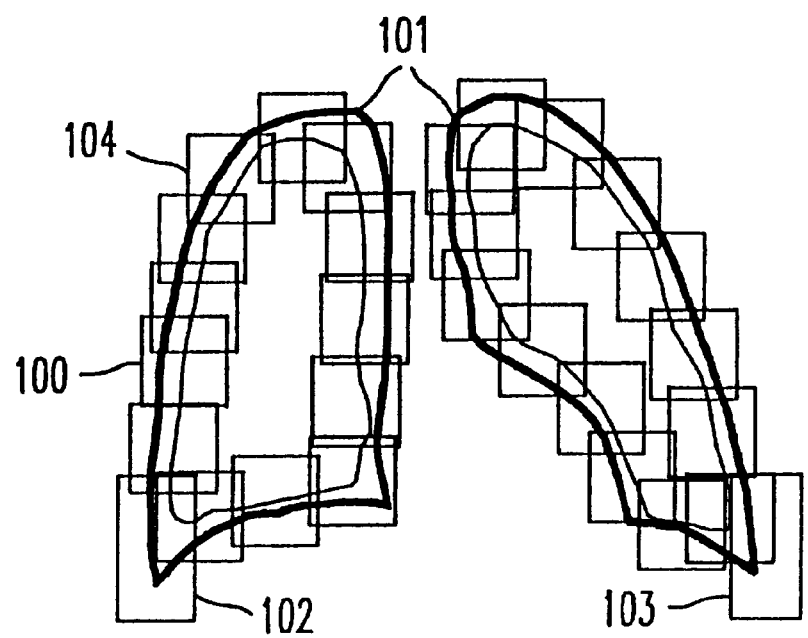
FIG. 10 is a schematic diagram showing the placement of ROIs for local threshold analysis along the initial contours that result from the iterative global threshold process.

It was found that these initial contours tended to under-represent the actual lung regions. Since increasing the largest threshold gray value produced more artifacts in the resulting contours, a local thresholding scheme is applied to the output of the global thresholding scheme. FIG. 9 illustrates schematically the method for the local thresholding. Overlapping ROIs pixels are centered along the initial contours (step 90). In this example ROIs of dimension 31×31 were centered at every thirtieth point. Other sizes and spacing are possible. FIG. 10 schematically shows the placement of ROIs 100 along the lung contours 101. The pixels within each ROI are then turned "on" or "off" to form a binary image based on a threshold gray value determined individually for each ROI.

As shown in FIG. 9, it is determined in step 91 whether the ROIs are located on a lateral aspect of the lung. For ROIs along the medial and diaphragmatic aspects of each lung region, the mean pixel value within the ROI is selected as the threshold (step 92). For ROIs along the lateral aspect, a gray level histogram is constructed (step 93), and the initial choice of threshold is set equal to the gray value at which the histogram minimum with the largest gray value occurs. The threshold value actually used for the lateral ROIs is then an average of the initial threshold values of the ROI and its two neighboring ROIs. Thus the threshold values for each of the ROIs is determined by repeating the operation for all ROIs (step 94).

Figure 11A:
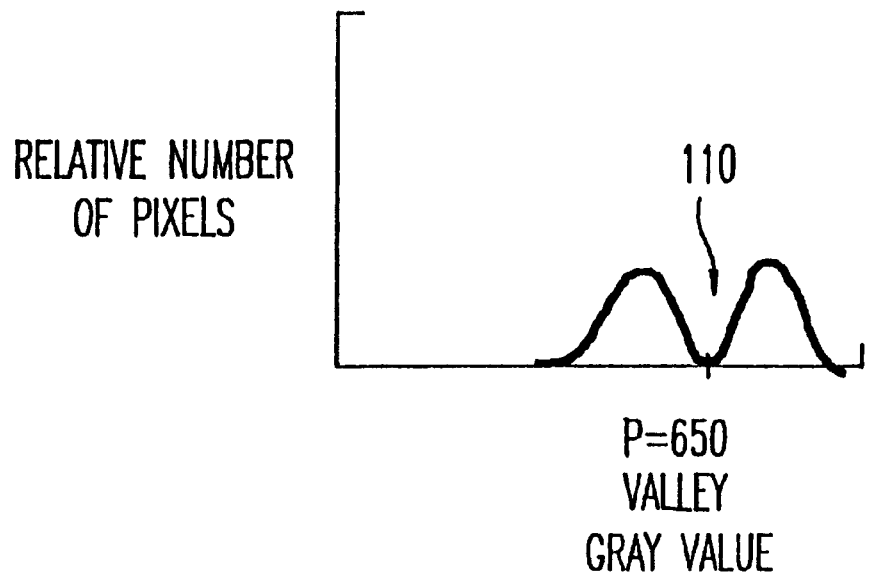
FIGS. 11A and 11B are diagrams illustrating local threshold analysis.
Figure 11B:
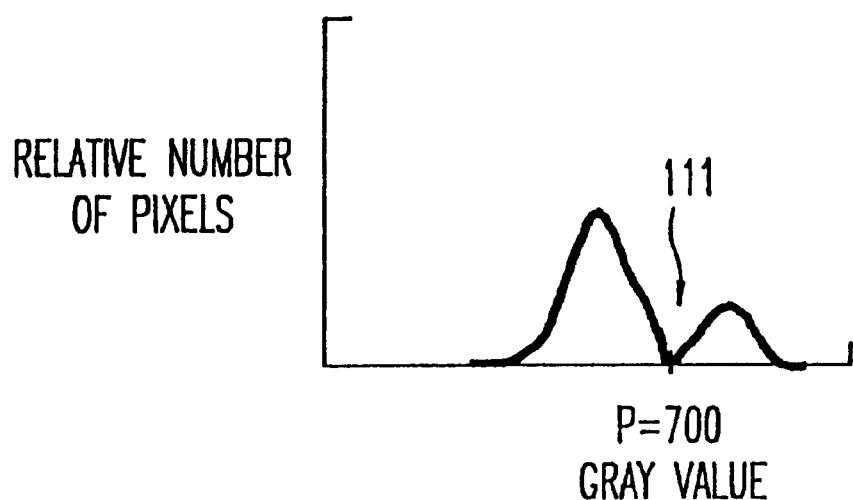

The local thresholding is described in more detail in FIG. 11A and 11B. FIG. 11A shows a histogram of a ROI such as 100 (see FIG. 10), while FIG. 11B shows a histogram of a ROI such as 104. The bimodal distribution results from the overlap of the contour, which produces valleys 110 and 111. In the local thresholding, the gray value $p_i$ of the center pixel of the ROI is replaced with one of two selected gray values depending on whether $p_i < p_{valley}$ or $p_i \geq p_{valley}$. Or, $$p(x, y) = \begin{cases} 1 & \text{if } p(x, y) \geq \text{threshold cutoff of ROI centered at } p(x, y) \\ 0 & \text{if } p(x, y) < \text{threshold cutoff of ROI centered at } p(x, y) \end{cases}$$

Instead of 1, $p(x,y)$ could be left unchanged. This local thresholding thus provides a binary image.

The method, however, may under-represent the costophrenic angle and over-represent the cardiophrenic angle. To accommodate these important anatomical landmarks, two additional ROIs (102 and 103 in FIG. 10) are added to better capture the costophrenic angle, while the criterion for setting the threshold within the ROI overlaying the cardiophrenic angle was altered to yield a lower threshold value when necessary (step 95).

The binary image constructed by thresholding individual ROIs in this manner is sent to the contour detection routine, the morphological open operation is again applied, and the resulting final contours (step 96) are superimposed on the original image (step 97).

Figure 12:
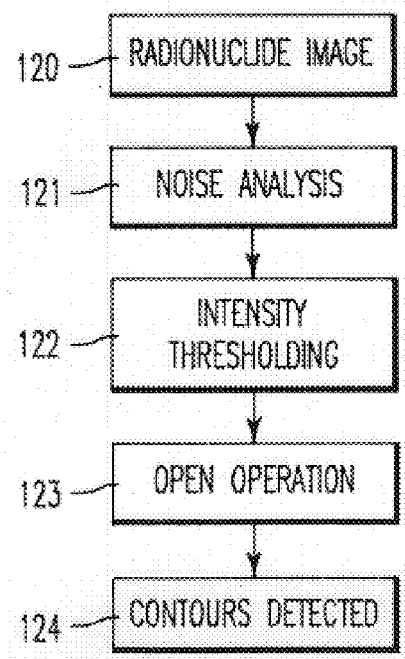
FIG. 12 is a schematic diagram illustrating the automated method for the contour detection in the radionuclide lung scans.
Figure 13:
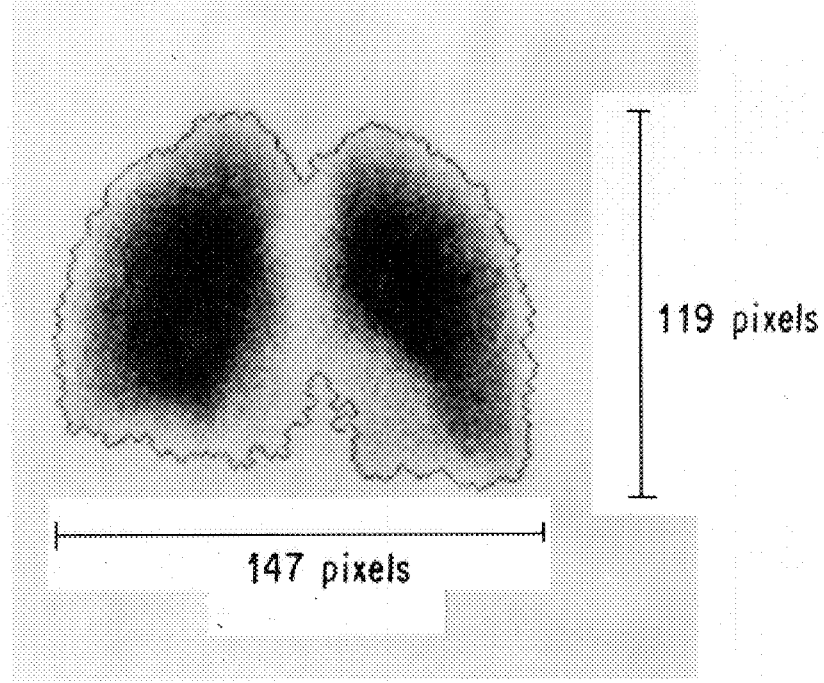
FIG. 13 shows a radionuclide chest image with lung contours delineated.

FIG. 12 shows a schematic diagram illustrating the automated method for the contour detection on the second image, a radionuclide image. After obtaining the radionuclide image (step 120), first order noise and background analysis is performed based on pixels in the lower 20% of the image matrix (step 121),i.e., that is, calculate the average pixel value and standard deviation based on pixels below row 206 in the 256×256 matrix; a pixel is only included in the calculation if it falls within a circle of a determined radius (such as 114 pixels) centered at array element (128, 128); this is taken to be the useful field of view of the gamma camera, which is used to acquire the radionuclide image. A threshold is then chosen based on the noise and the background level and a binary image is produced (step 122). The binary image is obtained from the perfusion scan by selecting as the threshold the average pixel value determined from the noise and background analysis plus 3 standard deviations; all pixels in the image with a pixel value greater than this threshold are turned "on". A morphological open operation is performed on the binary image in order to improve the connectivity of the remaining points after thresholding (step 123). The open filter can be circular with a diameter of 11 pixels. Contour detection is then performed (step 124). An 8-point connectivity scheme is used to construct boundaries around contiguous "on" pixels representing the regions of high activity (i.e. the lung regions). FIG. 13 shows a radionuclide chest image with lung contours delineated.

Figure 14:
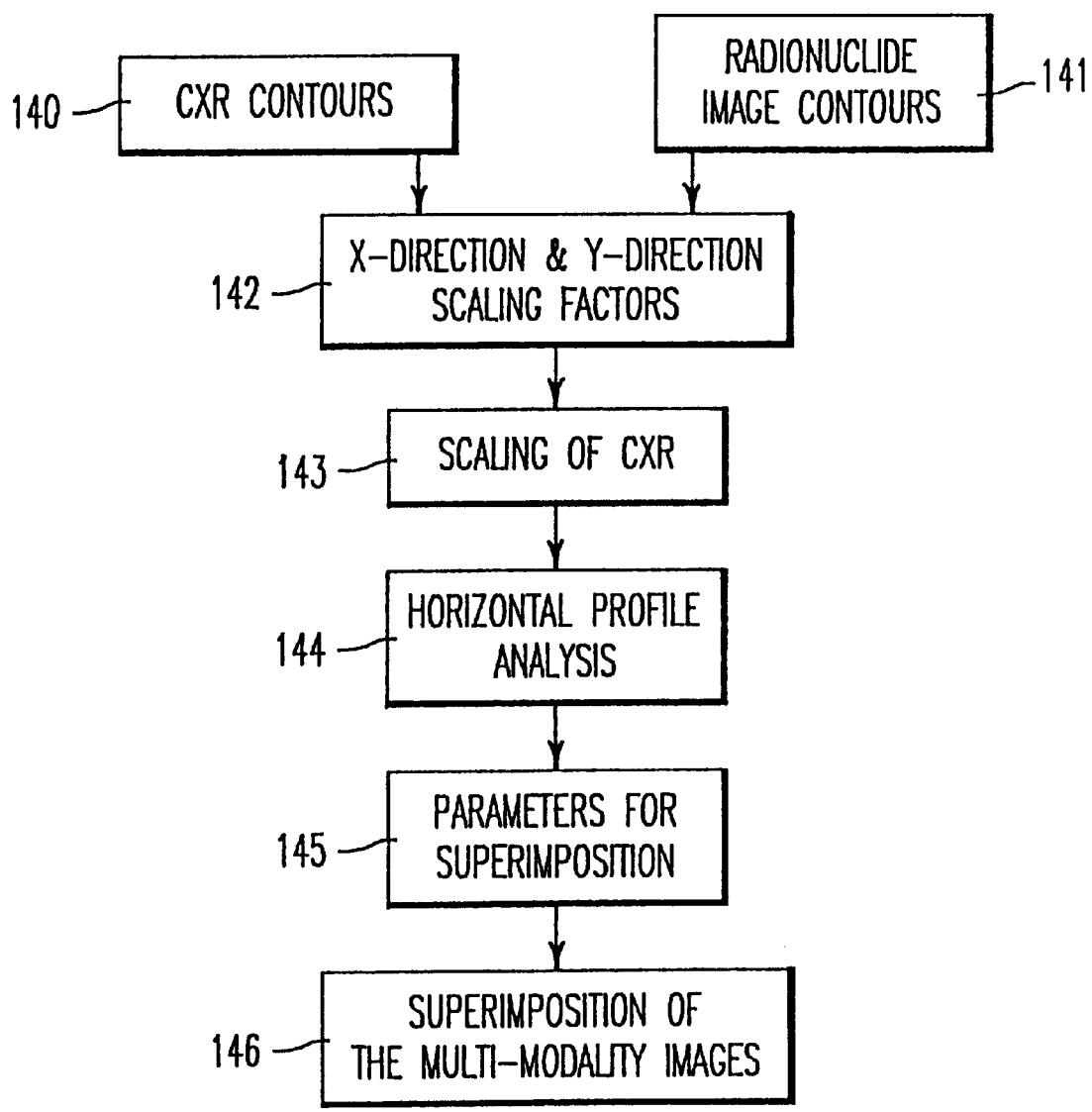
FIG. 14 is a schematic diagram illustrating the automated method for the scaling of the radiographic chest image to the radionuclide image and the superimposition of the two images.

In order to properly register the images from the two modalities, the effective pixel size of both images must be equal. To accomplish this, the matrix size of the radiographic image is reduced by an appropriates scaling factors in the x- and y-directions. FIG. 14 illustrates the automated method for the scaling of the radiographic chest image to the radionuclide image and the superimposition of the two images. The ratio of the maximum widths of the computer-determined contours for the radionuclide image 141 and the radiographic image 140 (CXR) is used as the x-direction scaling factor, and the ratio of the maximum heights of the contours is used as the y-direction scaling factor (step 142). An interpolation scheme is used to scale the radiographic image (step 143). This registration helps compensate for the fact that the radiographic chest image is usually obtained with the patient standing and the radionuclide scans are obtained with the patient sitting; this impacts the position of the diaphragm.

In order to determine the lung apices, horizontal profile analysis is performed on the radiographic image (step 144). The peak corresponding to the mediastinum is identified in order to determine the location of the mediastinum. The lung apices are identified by the row at which depressions between two peaks become apparent in the horizontal profile. Horizontal profile analysis is also used to locate the apices and mediastinum of the radionuclide image, noting the gray levels are reversed and peaks will correspond to the increase in intensity due to the presence of the lung.

Using the radiographic lung image, the gray levels of each row (horizontal profile) of the image are analyzed from top to bottom. Referring to the right image of FIG. 16A, the lungs are black. The initial profiles will be all white, and as the profiles move down through the lungs, two peaks will occur, and then disappear when the profile leaves the lung area.

A superimposed image is created (step 146) that shifts the perfusion scan in the x- and y-directions relative to the radiographic image in order to align the lung apices (in the y-direction) and the mediastinum (in the x-direction) using the parameters 145 obtained from step 144.

Figure 15:
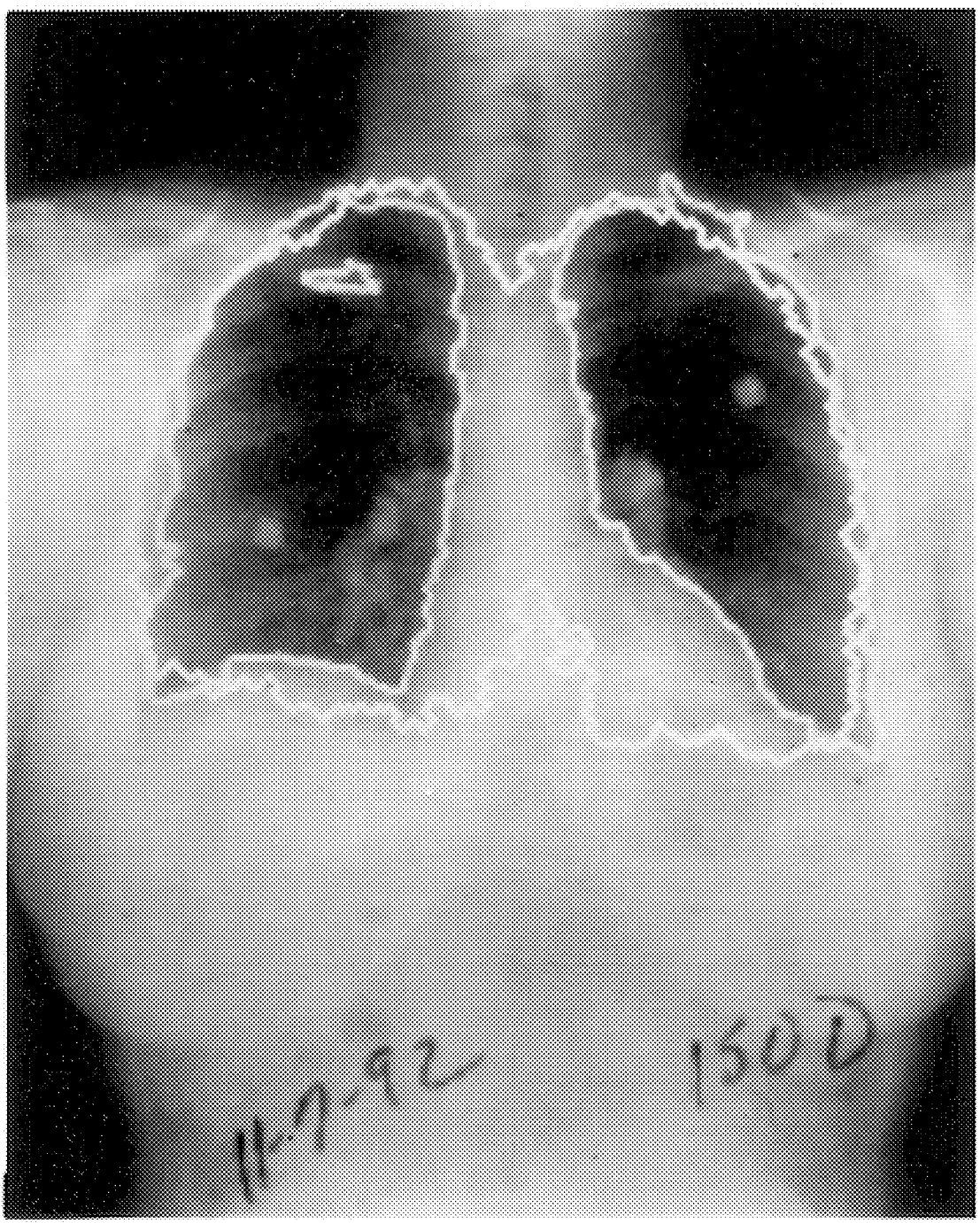
FIG. 15 shows a radiographic chest image with the contours from the radiographic image and the radionuclide image.
Figure 16A:
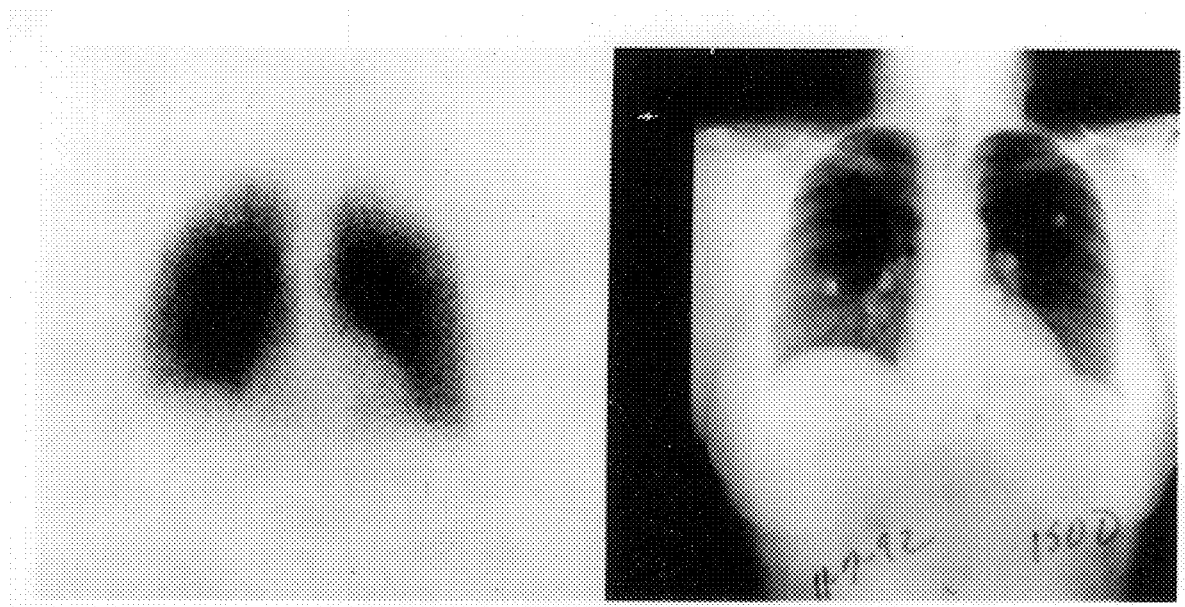
FIGS. 16A and 16B show one possible means for displaying both the structural detail and the functional information.
Figure 16B:
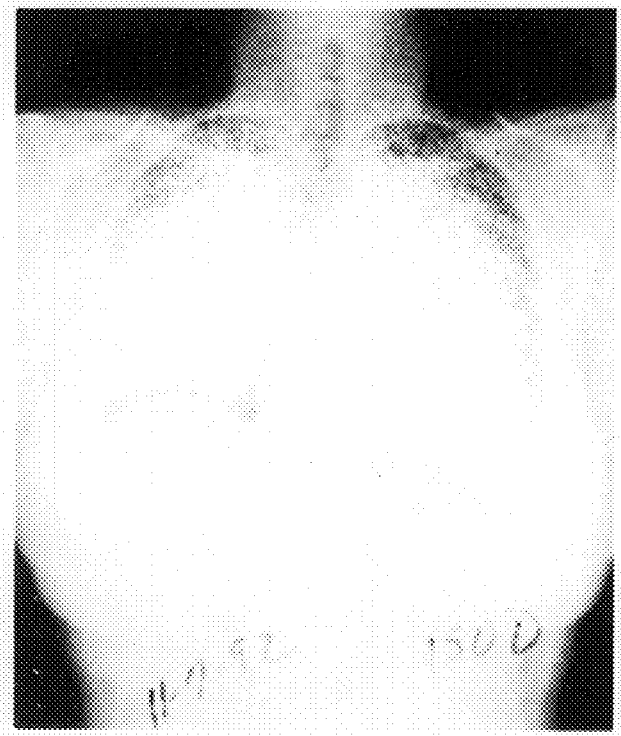

FIG. 15 shows a radiographic chest image with the contours from the radiographic image and the radionuclide image. FIGS. 16A and 16B show one possible means for displaying both the structural detail and the functional information. FIG. 16A shows a radionuclide (left) and radiographic image (right), while FIG. 16B shows the resulting image which is a combination of a functional and structural image. The functional image would be placed on the structural image in a transparent color (as opposed to the black shown in the figure) to allow simultaneous visualization of structural information and functional information.

Figure 17:
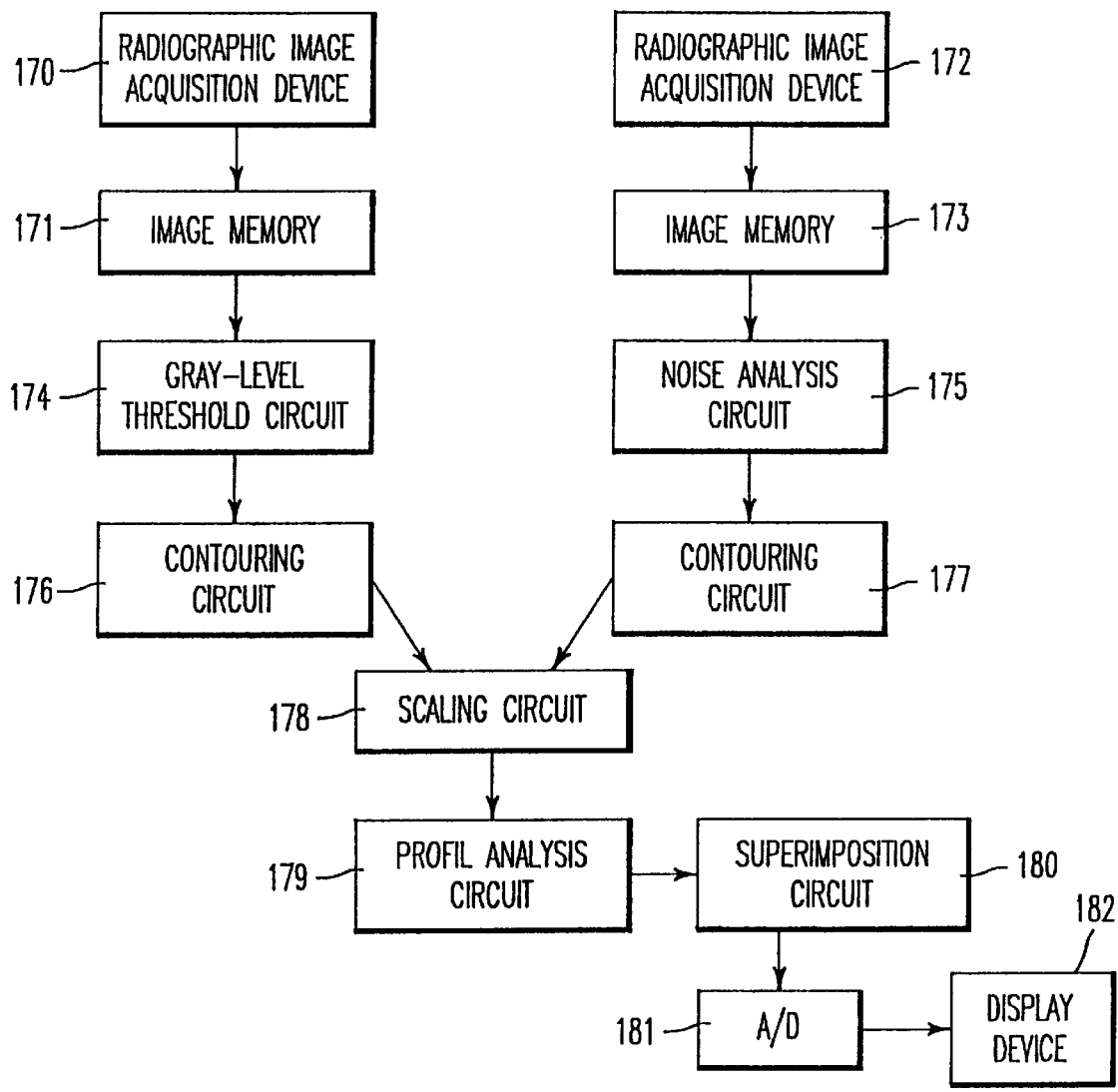
FIG. 17 is a schematic block diagram illustrating a system for implementing the automated method for the registration and correlation of radiographic images with radionuclide images.

FIG. 17 is a more detailed schematic block diagram illustrating a system for implementing the method of the invention. Referring to FIG. 17, radiographic images of an object are obtained from an image acquisition device 170 and input to the system. Each chest image is digitized by device 170 and put into image memory 171. Radionuclide images of an object are obtained from an radionuclide image acquisition device 172 and input to the system and stored in image memory 173. The radiographic image data are first passed through the gray level threshold circuit 174 and the contour analysis circuit 175. The radionuclide image data are passed to the noise analysis circuit 176 and the contouring circuit 177 in order to determine the final boundary of each lung region. The contours are passed to the scaling circuit 178 and image data are passed to the profile analysis circuit 179 in order to determine the appropriate minification and shift of the radiographic image. In the superimposing circuit 180 the either the contours are superimposed onto one or both chest images or the radionuclide lung data can be superimposed onto the radiographic image for simultaneous viewing of structural and functional information. The results are then displayed on the display system 182 after passing through a digital-to-analog converter 181.

Figure 18:
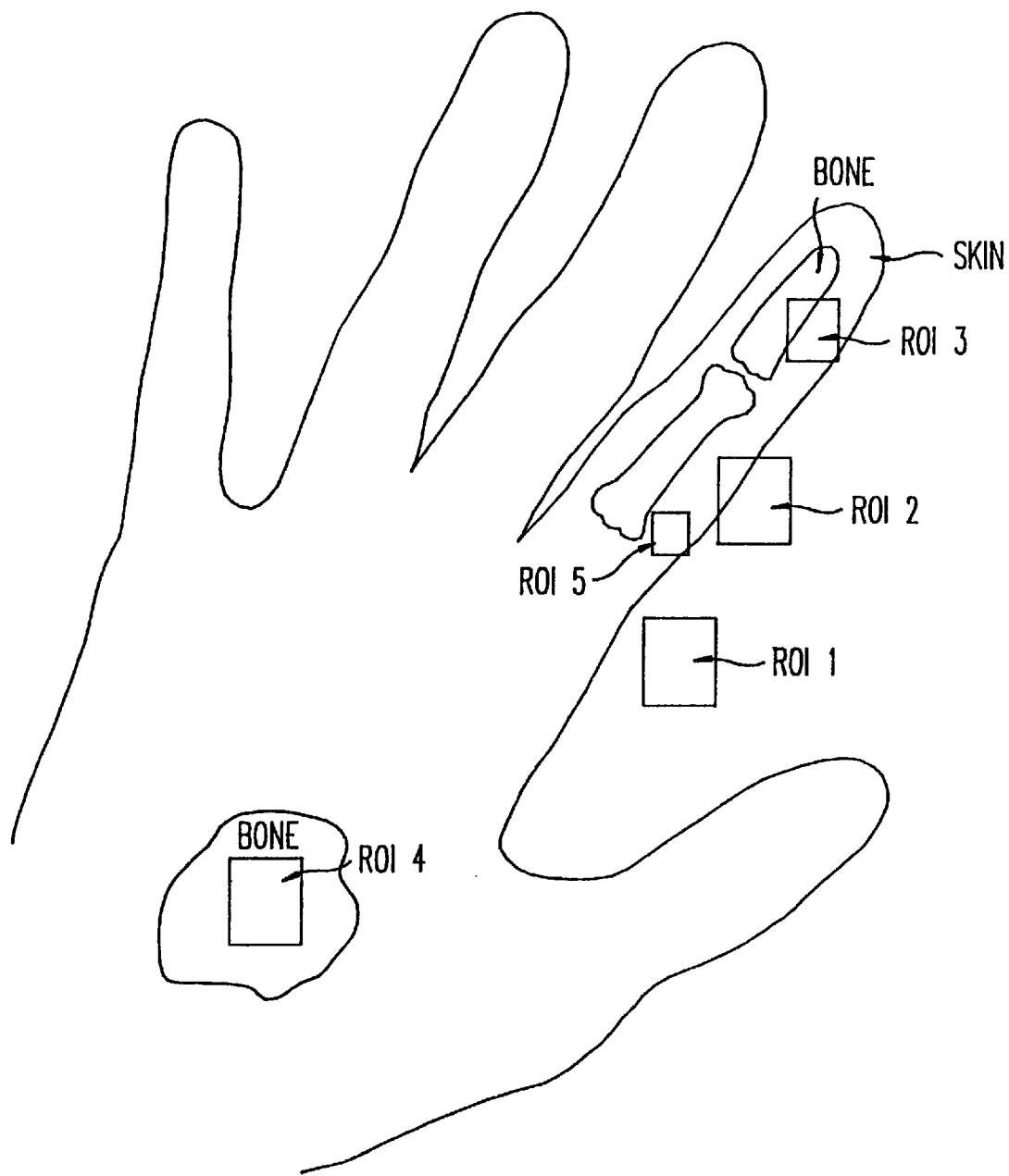
FIG. 18 is a schematic diagram of threshold of an image of the hand.

The method according to the invention can also be applied to other portions of the body such as the hand. Both a radiographic and radionuclide image of the hand are obtained. In the segmentation of the radiographic image of the hand from the directly exposed region (the region outside of the hand image), both global and local thresholding can be used. Local thresholding is used to segment bone from skin. As shown in FIG. 18, a number of ROIs (ROI1–ROI5, in this example) can be placed on the hand image. The corresponding pixel distributions for ROI1–ROI3 are shown in FIGS. 19A–19C. As ROI1 is entirely in the directly exposed region, the pixel distribution shows a single peak with no valley (FIG. 19A). Thus the center pixel of ROI1 is set to a constant $K_1$. In ROI2, a valley is found at gray level $p_2$. If the center pixel in ROI2 has a gray value less than $p_2$ then the center pixel is assigned a gray value of $K_2$. If the center pixel in ROI2 has a gray value greater than $p_2$ then the center pixel is assigned a gray value of $K_3$. In ROI3, a valley is found at gray level $p_3$. The center pixel of ROI3 is assigned gray value $K_2$ or $K_3$ if its gray value is less than or greater than $p_3$, respectively. It should be noted that ROI4 and ROI5 will have a single peak distribution similar to FIG. 19A as ROI4 is entirely within the bone and ROI5 is entirely within the skin.

The advantage of the local thresholding is that the peak shown in ROI3 may be too small to be detected on a histogram of an entire image, as shown in FIG. 19D.

The analysis of the radionuclide hand is the same as that described for the radionuclide chest image.

Obviously, numerous modifications and variations of the present invention are possible in light of the above technique. It is therefore to be understood that within the scope of the appended claims, the invention may be practiced otherwise than as specifically described herein. Although the current application is focused on single-projection images of the chest, the concept can be expanded to the multi-modality analysis and display of other body parts.

What is claimed as new and desired to be secured by letters patent of the United States is:

1. A method of correlating images from two modalities, comprising:

obtaining a first image containing an anatomic feature using a first modality;

obtaining a second image containing said anatomic feature using a second modality;

detecting a first feature contour of said anatomic feature in said first image iteratively using estimated contours derived using a plurality of successive gray-level thresholding operations at a respective plurality of gray-level thresholds, including:

thresholding said first image using one of said plurality of gray-level thresholds, determining whether to alter pixels in said first image, and thresholding said first image using a subsequent one of said gray-level thresholds after said determining step;

detecting a second feature contour of said anatomic feature in said second image; and superposing said first feature contour and said second feature contour.

2. A method as recited in claim 1, further comprising scaling said first feature contour.

3. A method as recited in claim 1, wherein performing iterative gray-level thresholding comprises:

obtaining a global gray-level histogram of said first image including said anatomic feature; and obtaining a plurality of global gray-level threshold values using said global gray-level histogram.

4. A method as recited in claim 1, wherein performing iterative gray-level thresholding comprises:

performing global gray-level thresholding to obtain a first initial contour of said anatomic feature; and performing local gray-level thresholding using said first initial contour to obtain said first feature contour.

5. A method as recited in claim 1, wherein performing iterative gray-level thresholding comprises:

obtaining a global gray-level histogram of said first image including said anatomic feature;

obtaining a plurality of global gray-level threshold values using said global gray-level histogram;

generating a binary image using each of said plurality of global gray-level threshold values; and determining a first initial contour using said binary images.

6. A method as recited in claim 1, comprising:

obtaining a radiographic chest image as said first image;

digitizing said radiographic chest image to obtain a digitized chest image; and detecting lung contours in said digitized chest image.

7. A method as recited in claim 6, comprising:

obtaining a global gray-level histogram of a selected portion of said digitized chest image;

identifying lung and mediastinum peaks in said global gray-level histogram;

identifying a minimum in said global gray-level histogram between said lung and mediastinum peaks; and selecting a plurality of gray-level threshold values between said minimum and said lung peak.

8. A method as recited in claim 7, further comprising:

generating a plurality of binary images using said digitized chest image at each of said plurality of gray-level threshold values, respectively;

producing a plurality of contours of each of said plurality of binary images, respectively;

determining a plurality of centroids for each of said plurality of contours, respectively;

determining a centroid limit in said digitized chest image; and selecting pixels located within each of said plurality of contours when a corresponding one of said centroids is located within said centroid limit.

9. A method as recited in claim 1, comprising:

obtaining a radionuclide chest image as said second image;

performing noise analysis on said radionuclide chest image;

selecting a threshold value based on said noise analysis;

generating a binary image using said threshold value;

performing a morphological open operation on said binary image; and detecting said second feature contour using said binary image after performing said morphological open operation.

10. A method as recited in claim 1, comprising:

obtaining a radiographic hand image as said first image; and performing iterative gray-level thresholding on said radiographic hand image.

11. A method as recited in claim 10, comprising:

obtaining a radionuclide hand image as said second image;

performing noise analysis on said radionuclide hand image;

selecting a threshold value based on said noise analysis;

generating a binary image using said threshold value;

performing a morphological open operation on said binary image; and detecting said second feature contour using said binary image after performing said morphological open operation.

12. A method as recited in claim 1, comprising:

obtaining a radiographic image as said first image;

digitizing said radiographic image to obtain a digitized image;

detecting said first feature contour in said digitized image;

obtaining a radionuclide image as said second image;

performing noise analysis on said radionuclide image;

selecting a threshold value based on said noise analysis;

generating a binary image using said threshold value;

performing a morphological open operation on said binary image; and detecting said second feature contour using said binary image after performing said morphological open operation.

13. A method as recited in claim 12, wherein detecting said first feature contour in said digitized image comprises:

obtaining a first gray-level histogram of said radiographic image including said anatomic feature;

obtaining a plurality of first gray-level threshold values using said first gray-level histogram;

generating a first binary image of said region at each of said plurality of first gray-level threshold values;

determining a first initial contour using said first binary images;

placing a plurality of regions of interest (ROIs) on said first initial contour;

producing a respective plurality of second gray-level histograms of pixels located within each of said plurality of ROIs;

determining a respective plurality of second gray-level threshold values using said plurality of second gray-level histograms;

selecting pixels within said ROIs using respective ones of said second gray-level thresholds;

generating a second binary image using said selected pixels; and detecting a boundary of said second binary image as said first feature contour.

14. A method of correlating images from two modalities, comprising:

obtaining a first image containing an anatomic feature using a first modality;

obtaining a second image containing said anatomic feature using a second modality;

detecting a first feature contour of said anatomic feature in said first image using iterative gray-level thresholding;

detecting a second feature contour of said anatomic feature in said second image: and superposing said first feature contour and said second feature contour;

wherein performing iterative gray-level thresholding comprises obtaining a global gray-level histogram of said first image including said anatomic feature;

obtaining a first derivative of said global gray-level histogram to identify a peak and a minimum in said histogram;

determining gray-level values of said peak and minimum; and selecting a predetermined number of gray-level values spaced between gray-level values of said peak and said minimum as said global gray-level threshold values.

15. A method of correlating images from two modalities, comprising:

obtaining a first image containing an anatomic feature using a first modality;

obtaining a second image containing said anatomic feature using a second modality;

detecting a first feature contour of said anatomic feature in said first image using iterative gray-level thresholding;

detecting a second feature contour of said anatomic feature in said second image; and superposing said first feature contour and said second feature contour;

wherein performing iterative gray-level thresholding comprises;

obtaining a global gray-level histogram of said first image including said anatomic feature;

obtaining a plurality of global gray-level threshold values using said global gray-level histogram;

generating a binary image using each of said plurality of global gray-level threshold values; and determining a first initial contour using said binary images; and wherein determining said first initial contour comprises:
selecting pixels in said first image having a gray-level value greater than a predetermined gray-level threshold value and less than a corresponding one of said global gray-level threshold values to obtain at least one region;

producing a boundary of said at least one region;

determining whether said at least one region is located within said anatomic feature;

eliminating a region determined not to be in said anatomic feature; and repeating said steps of selecting pixels, producing a boundary, determining whether said at least one region is located within said anatomic feature and eliminating a region for each of remaining ones of said global gray-level threshold values.

16. A method as recited in claim 15, wherein said steps of determining whether said at least one region is located within said anatomic feature and eliminating a region comprise:

determining a centroid limit for said anatomic feature;

determining a centroid of said at least one region; and eliminating said at least one region if said centroid is located outside said centroid limit.

17. A method as recited in claim 16, comprising:

selecting a first centroid limit for use with selected ones of said global gray-level thresholds; and selecting a second centroid limit for use with remaining ones of said global gray-level thresholds.

18. A method as recited in claim 15, further comprising:

performing a morphological open operation on a selected one of said binary images.

19. A method as of correlating images from two modalities, comprising:

obtaining a first image containing an anatomic feature using a first modality;

obtaining a second image containing said anatomic feature using a second modality;

detecting a first feature contour of said anatomic feature in said first image using iterative gray-level thresholding;

detecting a second feature contour of said anatomic feature in said second image; and superposing said first feature contour and said second feature contour;

wherein performing iterative gray-level thresholding comprises;

performing global gray-level thresholding to obtain a first initial contour of said anatomic feature; and performing local gray-level thresholding using said first initial contour to obtain said first feature contour; and wherein performing local gray-level thresholding comprises:

placing a plurality of regions of interest (ROIs) on said first initial contour;

producing a respective plurality of gray-level histograms of pixels located within each of said plurality of ROIs;

determining a respective plurality of gray-level threshold values using said plurality of gray-level histograms;

selecting pixels within said ROIs using respective ones of said gray-level thresholds;

generating a binary image using said selected pixels; and detecting a boundary of said binary image as said first feature contour.

20. A method as recited in claim 19, comprising placing said plurality of ROIs on said first initial contour such that said ROIs overlap each other.

21. A method as recited in claim 19, wherein determining said gray-level threshold comprises:

detecting at least one minimum in said gray-level histogram;

determining a gray-level value for each of said at least one minimum; and selecting a gray-level threshold value as a largest one of said gray-level value for each of said at least one minimum.

22. A method as recited in claim 19, further comprising performing a morphological open operation on said binary image.

23. A method of correlating images from two modalities, comprising:

obtaining a radiographic chest image containing lung having a plurality of pixels as a first image using a first modality;

obtaining a second image containing said lung using a second modality;

detecting an initial lung contour in said first image using iterative gray-level thresholding:

placing a plurality of regions of interest (ROIs) on said initial lung contour;

selecting a gray-level threshold value in each of said ROIs;

selecting pixels in said ROIs based upon corresponding ones of said gray-level threshold values;

detecting a second lung contour in said second image; and superposing said first and second images.

24. A method as recited in claim 23, comprising:

determining whether an ROI is located on at least one of a medial and a diaphragmatic aspect of said initial lung contour; and selecting a mean value of pixels located within an ROI as said gray-level threshold for each ROI determined to be located on said at least one of said medial and said diaphragmatic aspects of said initial lung contour.

25. A method as recited in claim 23, comprising:

determining whether an ROI is located on a lateral aspect of said initial lung contour;

generating a gray-level histogram for each ROI determined to be located on said lateral aspect of said initial lung contour;

determining at least one minimum in each of said pray-level histograms;

determining a gray level value for each of said at least one minimum in each of said gray-level histograms:

selecting an initial gray-level threshold value as a largest one of said gray-level value for each of said at least one minimum for each said ROI determined to be located on said lateral aspect of said initial lung contour; and selecting a gray-level threshold value for each said ROI determined to be located on said lateral aspect of said initial lung contour as an average of a corresponding one of said initial gray-level threshold values and initial gray-level threshold values of a neighboring two ROIs of said ROI determined to be located on said lateral aspect of said initial lung contour.

26. A method as recited in claim 23, comprising:

placing an additional first ROI over the costophrenic angle; and placing an additional second ROI over the cardiophrenic angle.

27. A method of correlating images from two modalities, comprising:

obtaining a first image containing an anatomic feature using a first modality;

obtaining a second image containing said anatomic feature using a second modality;

detecting a first feature contour of said anatomic feature in said first image using iterative gray-level thresholding;

detecting a second feature contour of said anatomic feature in said second image; and superposing said first feature contour and said second feature contour;

wherein said superposing step comprises:

determining a first ratio of a first maximum width of said first feature contour to a second maximum width of said second feature contour;

determining a second ratio of a first maximum height of said first feature contour to a second maximum height of said second feature contour;

using said first and second ratios as first and second direction scaling factors, respectively; and scaling said first feature contour using said first and second ratios.

28. A method as recited in claim 27, further comprising:

performing horizontal profile analysis on said first and second images to identify a predetermined location in each of said first and second images;

shifting said second image relative to said first image in said first and second directions to align and overlay said first and second images using said predetermined location in each of said first and second images; and displaying said first image aligned and overlaid with said second image.

29. A method as recited in claim 28, further comprising:

displaying said first and second feature contours on said first image aligned and overlaid with said second image.

30. A method as of correlating images from two modalities, comprising:

obtaining a first image containing an anatomic feature using a first modality;

obtaining a second image containing said anatomic feature using a second modality;

detecting a first feature contour of said anatomic feature in said first image using iterative gray-level thresholding;

detecting a second feature contour of said anatomic feature in said second image;

superposing said first feature contour and said second feature contour;

obtaining a chest image as said first and second images;

obtaining first and second lung contours as said first and second feature contours;

determining a first ratio of a first maximum width of said first lung contour to a second maximum width of said second lung contour;

determining a second ratio of a first maximum height of said first lung contour to a second maximum height of said second lung contour;

using said first and second ratios as first and second direction scaling factors, respectively; and scaling said first feature contour using said first and second ratios.

31. A method as recited in claim 30, further comprising:

performing horizontal profile analysis on said first and second images to identify lung apices in each of said first and second images;

shifting said second image relative to said first image in said first and second directions to align and overlay said first and second images using said lung apices in each of said first and second images; and displaying said first image aligned and overlaid with said second image.

32. A method of correlating images from two modalities, comprising:

obtaining a first image containing an anatomic feature using a first modality;

obtaining a second image containing said anatomic feature using a second modality;

detecting a first feature contour of said anatomic feature in said first image using iterative gray-level thresholding;

detecting a second feature contour of said anatomic feature in said second image;

superposing said first feature contour and said second feature contour;

obtaining a radiographic image as said first image; and performing iterative gray-level thresholding on said radiographic image;

wherein performing iterative gray-level thresholding comprises:

placing a plurality of ROIs on said radiographic image;

generating a plurality of gray-level histograms for each of said ROIs, respectively;

determining a plurality of gray-level threshold values for each of said ROIs, respectively, using corresponding ones of said gray-level histograms; and modifying a gray-level value of a predetermined pixel in selected ones of said ROIs using respective ones of said gray-level threshold values.

33. A system for correlating images from two different modalities, comprising:

a first image acquisition device;

a second image acquisition device;

a first contouring circuit to provide first contours of a feature in an image obtained using said first image acquisition device by iteratively using estimated contours derived from a plurality of successive gray-level thresholding operations at a respective plurality of gray-level thresholds, including thresholding said first image using one of said plurality of gray-level thresholds, determining whether to alter pixels in said first image, and thresholding said first image using a subsequent one of said gray-level thresholds after said determining step;

a second contouring circuit, connected to said second image acquisition device, to provide second contours of said feature in said second image;

a superposition circuit connected to said first and second contouring circuits; and a display.

34. A system as recited in claim 33, wherein:

said first image acquisition device comprises a radiographic image acquisition device; and said second image acquisition device comprises a radionuclide image acquisition device.

35. A system as recited in claim 33, comprising:

first and second image memories connected to said first and second image acquisition devices, respectively.

36. A system as recited in claim 33, wherein said superposition circuit comprises:

a scaling circuit;

a profile analysis circuit;

an image overlaying circuit; and a circuit for overlaying said contours on an overlayed image comprised of said first and second images being overlayed.

37. A system as recited in claim 33, wherein said first contouring circuit comprises:

a local gray-level thresholding circuit; and a global gray-level thresholding circuit.

38. A method of determining an image contour, comprising:

obtaining a first image containing an anatomic feature;

obtaining a plurality of gray-level thresholds in said first image;

thresholding said first image using one of said plurality of gray-level thresholds;

determining whether to alter pixels in said first image based upon said thresholding;

thresholding said first image using a second one of said plurality of gray-level thresholds after said determining step;

generating a plurality of initial contours using said thresholding steps; and detecting a first feature contour of said anatomic feature using said plurality of initial contours.

39. A method as recited in claim 38, comprising:

determining a first gray-level threshold used to produce a first binary image; and increasing a gray-level value of each subsequent gray-level threshold used to produce respective subsequent binary images.

40. A method as recited in claim 39, wherein determining said first gray-level threshold comprises:

generating a gray-level histogram of said first image; and obtaining a first derivative of said histogram;

selecting a gray-level value corresponding to a minimum in said histogram.

41. A method as recited in claim 40, comprising:

selecting a gray-level value corresponding to a maximum in said histogram; and obtaining said gray-level thresholds between said gray-level values corresponding to said minimum and said maximum.

42. A method as recited in claim 38, comprising:

thresholding said image using a smallest one of said plurality of thresholds;

producing a corresponding binary image;

processing said binary image; and repeating said thresholding, producing and processing steps using successively higher ones of said plurality of thresholds.

43. A method as recited in claim 42, wherein processing said binary image comprises:

eliminating portions of said binary image not meeting predetermined criteria.

44. A method as recited in claim 38, comprising:

altering pixels in said first image; and thresholding said first image after altering said pixels using said second one of said plurality of gray-level thresholds.

45. A method as recited in claim 44, wherein:

altering said pixels comprises setting said pixels to a predetermined gray-level value.

46. A method as recited in claim 38, comprising:

performing a respective plurality of thresholding operations using said plurality of gray-level thresholds; and determining whether to alter pixels after each thresholding operation;

wherein a second and subsequent ones of said plurality of thresholding operations are performed after performing a respective determining step.

47. A method as recited in claim 46, comprising:

if a pixel is determined to be altered, setting said pixel to a gray-level value below that of a gray-level threshold used in a subsequent thresholding operation.

48. A method as recited in claim 38, wherein said determining step comprises:

determining said pixels to be in a region not a part of said anatomic feature; and eliminating said pixels from consideration in a subsequent thresholding operation.

49. A method of determining a feature contour, comprising:

obtaining a digitized chest image containing at least one lung;

obtaining a global gray-level histogram of a selected portion of said digitized chest image;

identifying lung and mediastinum peaks in said global gray-level histogram;

identifying a minimum in said global gray-level histogram between said lung and mediastinum peaks;

selecting a plurality of gray-level threshold values between said minimum and said lung peak; and detecting a feature contour of said at least one lung in said chest image by iteratively using said plurality of gray-level threshold values.

50. A method as recited in claim 49, comprising:

obtaining said digitized chest image using a first modality;

obtaining a second image containing said at least one lung using a second modality; and superposing said digitized image and said second image.

51. A method as recited in claim 49, wherein iteratively using said plurality of gray-level thresholds comprises:

performing global gray-level thresholding to obtain an initial contour of said lung; and performing local gray-level thresholding using said initial contour to obtain said feature contour.

52. A method as recited in claim 51, wherein performing local gray-level thresholding comprises:

placing a plurality of regions of interest (ROIs) on said initial contour;

producing a respective plurality of gray-level histograms of pixels located within each of said plurality of ROIs;

determining a respective plurality of gray-level threshold values using said plurality of gray-level histograms;

selecting pixels within said ROIs using respective ones of said gray-level thresholds;

generating a binary image using said selected pixels; and detecting a boundary of said binary image as said feature contour.

* * * * *